UNITED STATES PATENT OFFICE.

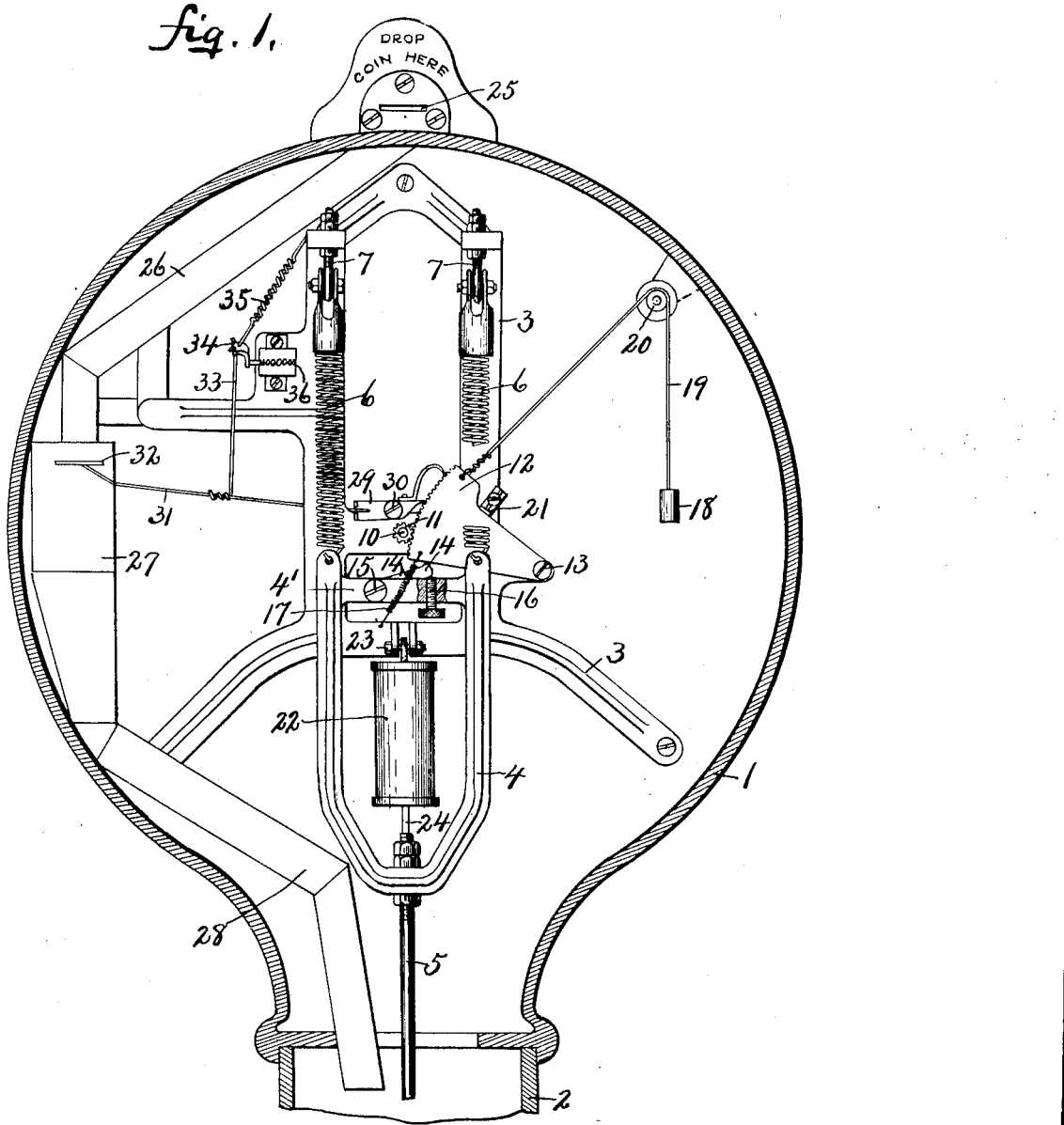

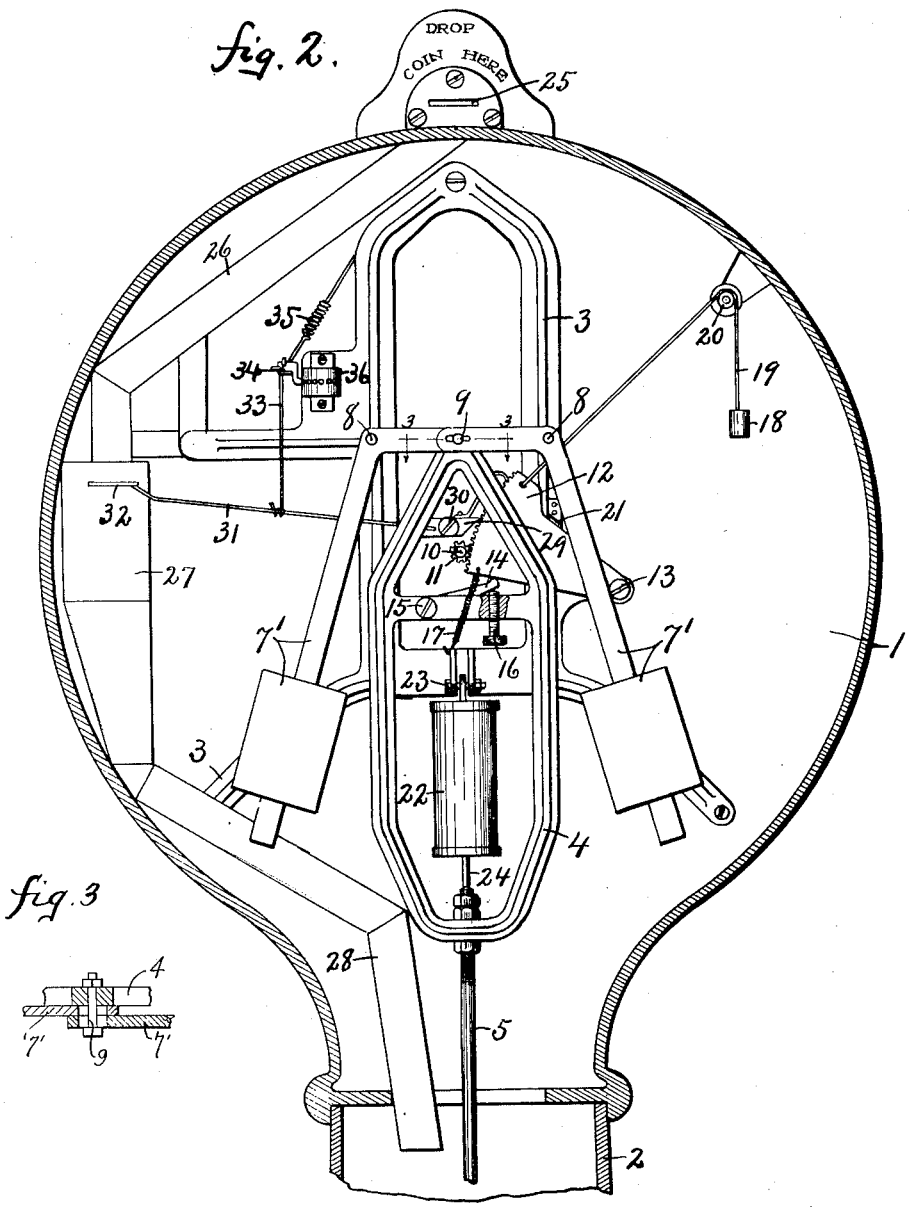

AARON VANDECAR, OF SYRACUSE, NEW YORK, ASSIGNOR TO COLONIAL MACHINE COMPANY, INC., OF SYRACUSE, NEW YORK, A CORPORATION OF DELAWARE.

WEIGHING-SCALE.

1,346,862.  Specification of Letters Patent.  Patented July 20, 1920.

Application filed August 2, 1919.  Serial No. 314,899.

*To all whom it may concern:*

Be it known that I, AARON VANDECAR, of Syracuse, in the county of Onondaga, in the State of New York, have invented new and useful Improvements in Weighing-Scales, of which the following, taken in connection with the accompanying drawings, is a full, clear, and exact description.

This invention relates to certain improvements in weighing scales in which a pointer is mounted upon a rotary spindle and is movable around a circular dial as the spindle is rotated and refers more particularly to the means for rotating the spindle independently of but controlled by the weight actuated mechanism.

The main object is to rotate the shaft or spindle through the medium of a rack and pinion in which the rack merely follows the movement of the weight operated mechanism during the weighing operation independently of said mechanism to avoid the objectionable shock and resultant lost vibration of the pointer incidental to the direct connections between the weight operated mechanism and spindle as heretofore practised.

Other objects and uses relating to specific parts of the device will be brought out in the following description.

In the drawings:

Figure 1 is an elevation partly in section of the upper portion of a coin controlled weighing scale embodying the features of my invention in which coil springs are employed as the retracting means for the weight operated plunger.

Fig. 2 is a similar view in which weights are employed in place of the springs for retracting the weight operated plunger.

Fig. 3 is a detailed sectional view through the adjacent ends of the upper horizontal portion of the connection between the bell-crank levers and vertically movable frame taken on line 3—3 Fig. 2.

As illustrated the device comprises a substantially circular head or face —1— mounted upon the upper end of a tubular column —2— for receiving and supporting the mechanism forming the subject matter of my invention.

A skeleton frame —3— is rigidly secured within the case —1— and forms a guide for a vertically movable frame or plunger —4— to which is secured a plunger rod —5— leading to any suitable weight support by which the weight of an object may be transmitted to the rod —5— and thence to the plunger frame —4—.

The means for retracting the plunger —4— and its rod —5— after the weighing operation may consist of a pair of coil springs —6— having their lower ends attached to the upper ends of the plunger —4— and their upper ends attached to adjustable anchorage —7— on the frame —3— or the spring retracting means may be replaced by weighted levers —7'— as in Fig. 2 in which the levers are pivoted at —8— to opposite sides of the frame —3— and have their shorter arms pivotally connected at —9— to each other with sufficient lost motion to enable them to swing through different arcs about their pivots without losing their coöperative connection one way or the other.

A shaft or spindle —10— is centrally journaled in the case —1— to receive an index finger (not shown) which is movable around a suitable dial (not shown) concentric with the shaft and circular portion of the case —1—.

Secured to the spindle —10— is a pinion —11— in direct mesh with a segmental rack —12— which is pivoted at —13— to the frame —3— to swing in a plane at right angles to said shaft and also in a plane parallel with the movement of the plunger —4— in close proximity thereto.

The lower edge of the segment —12— is yieldingly held against the free end of a pawl —14— which is pivoted at —15— to a cross bar —4'— on the plunger —4— and may be adjusted about the axis of its pivot by means of a screw —16— in the cross bar —4'— to effect a similar adjustment of the rack —12— and thereby permitting the pointer or index finger (not shown) to be set at its zero position when the parts are normal or inactive.

The segment —12— is independently held against the free end of the pawl —14— by means of a spring —17— having one end attached to the frame —3— and its other end attached to the segment, said spring being normally extended or under tension whereby when the plunger —4— is moved downwardly by the weight of an object the spring —17— will cause the inner end of the segment —12— to follow against the pawl —14— thereby rotating the pinion —11— and its shaft —10— and causing a corresponding movement of the index finger around the dial to indicate the weight.

A counter weight —18— is attached to one end of a cord or cable —19— which in turn is passed over a sheave —20— on the inside of the case —1— and connected to the upper edge of the segment —12— to steady said segment in its movement. It is to be understood, however, that the spring —17— is of sufficient strength or tension to overcome the counter weight —18— thereby drawing the latter upwardly as the segment is dropped downwardly with the plunger —4— during the weighing operation.

A stop —21— is adjustably secured to one side of the frame —3— to engage the upper edge of the segment —12— for limiting the upper movement of said segment when the index finger has been returned to its zero position.

In order that the plunger —4— may be gradually returned to its normal position by the springs —6— without excessive shock, I have provided a dash pot or cylinder —22— having one end attached at —23— to the frame —3— and its other end provided with an opening for the movement of a piston rod —24— therethrough, said piston rod having one end within the cylinder carrying a piston and its other end attached to the plunger rod —5—, it being understood that the dash pot is provided with the usual vents to regulate the speed of movement of the piston in both directions.

In some instances it may be desired to control the operation of the scales by means of a coin or check and for this purpose the upper portion of the case —1— is provided with a coin inlet —25— leading to an inclined coin chute —26— which is continued through an enlarged section —27— to an underlying section —28— from which the liberated coins are discharged into the column —2— and thence into any suitable receptacle which may be provided therefor.

A pawl —29— is pivoted at —30— intermediate its ends to the case —1— for engaging the teeth of the rack —12— just above the pinion —11— for normally locking said segment against movement although permitting the operation of the plunger —4— by the weight without effecting the operation of the pinion shaft —10— or index finger mounted thereon until a coin is placed in the machine. To this end the pawl —29— is provided with an extension —31— having a coin rest —32— within the section —27— in the path of the coin, said extension being connected by a link —33— to a lever —34— which in turn is connected by a spring —35— to a portion of the frame —3—, said lever being also provided with means for operating a counter —36— which indicates the number of coins passing through the chute. The spring —35— is comparatively light and of just sufficient tension to return the pawl —29— to its locking position and to permit the coin to rock the pawl from its locking position as it engages the rest —32— and from which it escapes into the underlying portion of the coin chute after tripping said pawl.

It is evident, however, that any other suitable coin operated mechanism may be used for locking or releasing the segment —12— and, therefore, I do not wish to limit myself to the construction shown.

What I claim is:—

1. In a weighing scale of the character described the combination with a frame, a weight operated plunger and retracting means therefor, of an abutment on the plunger, a rotary spindle for receiving and supporting an index finger, a pinion on the spindle, a segmental rack pivoted to the frame and engaging the pinion and a spring for holding the rack against said abutment independently of the plunger to cause said rack to follow the plunger in its movement against the action of the retracting means and a counter weight acting upon the segment against the action of but with less force than that of the spring.

2. In a weighing scale of the character described the combination of a stationary support, an abutment thereon, a plunger movable relative to the support, retracting means for the plunger, a pinion for operating an index finger, a segmental rack pivoted to the support and normally resting against said abutment, an abutment on the plunger engaging the one side of the rack and a spring having one end attached to the support and its other end attached to the rack to hold the latter in engagement with the last named abutment, said spring being tensioned to draw the rack in the direction of movement of the plunger as the latter is operated against the action of its retracting means.

In witness whereof I have hereunto set my hand this 24th day of July, 1919.

AARON VANDECAR.

Witnesses:
H. E. CHASE,
N. ROOT.